(12) United States Patent
Rivollet et al.

(10) Patent No.: US 6,437,893 B1
(45) Date of Patent: Aug. 20, 2002

(54) SYSTEM AND METHOD FOR TRANSMITTING MESSAGES, IN PARTICULAR FOR UPDATING DATA RECORDED IN ELECTRONIC LABELS

(75) Inventors: Robert Rivollet, 11, rue d'Houin, Chennevieres sur Marne (FR); Christian Heillaut, Mont Pres Chambord (FR)

(73) Assignee: Robert Rivollet (FR)

( * ) Notice: Subject to any disclaimer, the term of this patent is extended or adjusted under 35 U.S.C. 154(b) by 0 days.

(21) Appl. No.: 09/214,838
(22) PCT Filed: Jul. 10, 1997
(86) PCT No.: PCT/FR97/01265
§ 371 (c)(1),
(2), (4) Date: Sep. 24, 1999
(87) PCT Pub. No.: WO98/02846
PCT Pub. Date: Jan. 22, 1998

(30) Foreign Application Priority Data

Jul. 16, 1996 (FR) ............................................. 96 08872

(51) Int. Cl.[7] .............................................. H04B 10/00
(52) U.S. Cl. ...................................... 359/157; 345/170
(58) Field of Search ................................. 359/154, 157, 359/144, 172; 345/170

(56) References Cited

U.S. PATENT DOCUMENTS 5,402,257 A * 3/1995 Hasselmann et al. ........ 359/144
5,475,285 A    12/1995 Konopka ..................... 315/224
5,793,880 A *  8/1998 Constant ..................... 359/154

FOREIGN PATENT DOCUMENTS

DE  3227170 A1  6/1984
EP  0456462     11/1991

OTHER PUBLICATIONS

PCT International Search Report.

* cited by examiner

*Primary Examiner*—Kinfe-Michael Negash
(74) *Attorney, Agent, or Firm*—Bachman & LaPointe, P.C.

(57) ABSTRACT

A message transmission system comprises a transmitter and receivers, the transmitter comprising a generator for generating a digital data signal representing a message, and an encoder for encoding the digital data in a serial code having a first and second frequencies representing respectively digital data signal first and second logic states. A modulator is connected to at least one source of visible light for modulating the intensity of light emitted by the light source with the serial code. The light emitted by the light source has two distinct intensities when the light intensity is modulated with the first and second frequencies. Each receiver comprises a detector sensitive to the visible light emitted by the light source for converting visible light emitted by the source into an electrical signal having two states depending on the intensity of the visible light detected. A decoder reconstructs the transmitted message from the electrical signal.

9 Claims, 6 Drawing Sheets

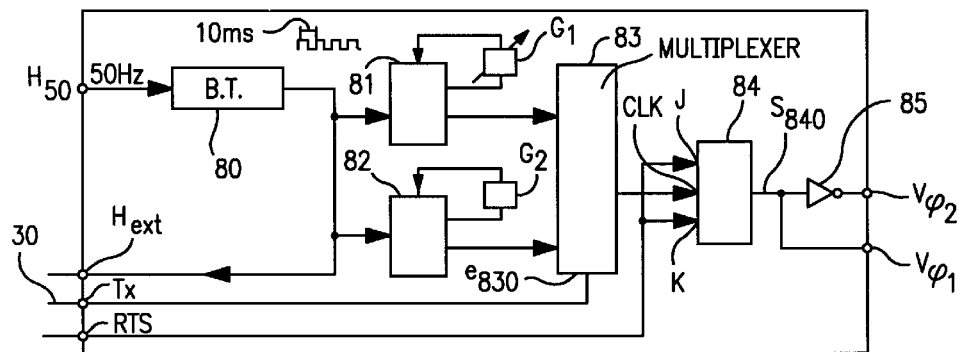
FIG. 10
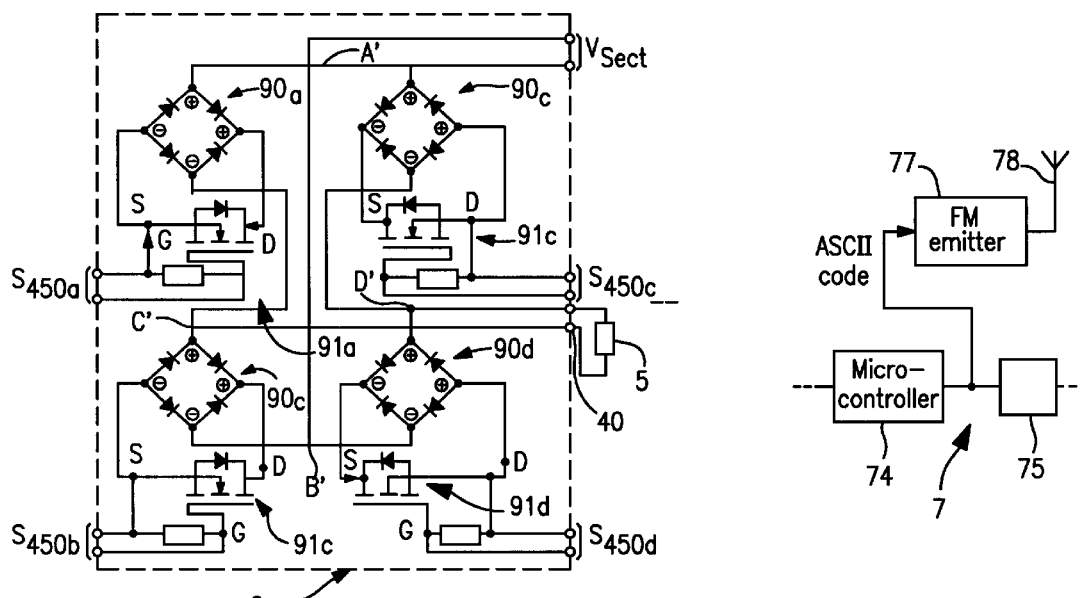
FIG. 11
FIG. 14
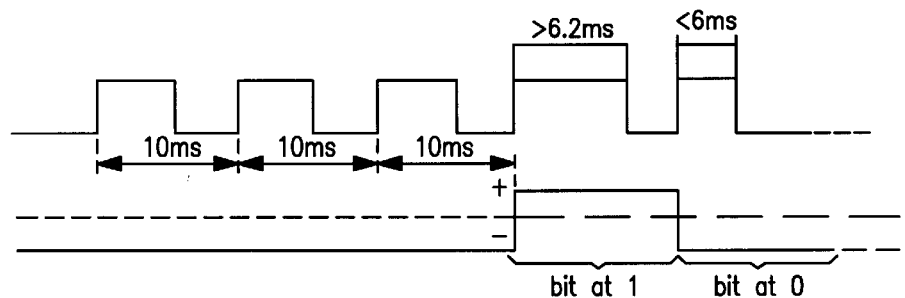
FIG. 13

SYSTEM AND METHOD FOR TRANSMITTING MESSAGES, IN PARTICULAR FOR UPDATING DATA RECORDED IN ELECTRONIC LABELS

The invention relates to a system for transmitting messages, in particular for programming and/or updating electronic devices including memory and/or display components.

The invention also relates to a method for employing such a system.

It applies preferably, but not exclusively, to the updating of data displayed by electronic labels, for example labels displaying a variety of information about a product: price, price per kg, etc. Such labels are arranged on presentation shelves for the aforementioned products in certain sales outlets (supermarkets or the like).

Further to this preferred application in retailing, a system according to the invention can be employed in a variety of other fields: updating timetable displays, etc.

To give a concrete idea, unless otherwise indicated, the preferred area of application of the invention, that is to say the updating of data displayed by electronic labels, will be assumed below.

Such labels are well-known per se. They generally include a memory, means for processing the information, or at least for programming and inputting data in order to record them in the memory, and a display, most often a liquid crystal display in order to save on the energy needed for the device to operate properly. By way of explanation, it is on the one hand beneficial to provide transportable apparatus, and on the other hand the large number of labels customarily used in a sales outlet will in practice prohibit supply by connecting to the mains.

Consideration may be given to programming and/or updating these labels by entering the data manually (for example using a keyboard). This method is time consuming and gives rise to errors.

It has also been proposed to establish computerized links between the labels and a central site for processing information, for example a managing computer. For the reasons indicated above, these links cannot be fixed.

A first class of system according to the prior art employs infrared links. This type of link, entirely comparable with those used in household remote control devices (televisions, etc.) presents the advantage of having a very large bandwidth and can therefore convey signals at a very high rate. However, such links present a major drawback. Specifically, these waves are highly directional and require that the receivers with which the labels are equipped be directed very accurately at the infrared wave emitters, which conflicts with the desired flexibility. It has to be possible to arrange the labels at a number of positions on a shelf, not only along it but also on different levels (racks), which runs the risk of their being placed in "shadow zones". It is in reality only possible to use this link method for fixed or semifixed installations.

In the prior art, it has also been proposed to use radio waves. However, although this type of link a priori meets the expressed needs, it gives rise to electromagnetic pollution which may prove unacceptable. Further, the standards in this field have been made more stringent: there is in particular an EU regulation in force since January 1996.

While keeping the advantages of the best performing prior art systems, in particular the opportunity for reliably updating a large number of electronic labels in a short time without imposing constraints on the way in which they are arranged, the invention aims to overcome the drawbacks.

To do this, the system according to the invention employs the modulation of visible light, and in particular, in a preferred embodiment, the modulation of light produced by fluorescent tubes.

It has been found that, when the supply frequency of a fluorescent tube is increased, the luminous intensity decreases. The tube behaves as an inductor. The invention profits from this phenomenon.

However, referring for example to the preferred application of the invention, the majority of stores are continuously illuminated with tubes of the aforementioned type. These tubes can therefore be used for the purpose of updating the labels. This will result in minor variations of the background luminosity and pulsations which can be made tolerable by particular arrangements that will be indicated below.

The system according to the invention essentially comprises four parts: a digital encoder, a light modulator which is controlled by the encoder and is used as a transmitter, a receiver sensitive to the modulation of the light emitted by the background illumination components which are controlled by the modulator, and a decoder, associated with signal processing circuits. These last two components constitute the core of the electronic label. It furthermore comprises a display component controlled by the signal processing circuits, the latter conventionally comprising one or more memories (random-access memory, fixed memory, registers). Use will preferably be made of a microcontroller, microprocessor or dedicated circuit, for example of the so-called ASIC type (Application Specific Integrated Circuit) if this is justified by the number of labels made.

According to a first embodiment of the invention, frequency modulation is carried out. Since the encoding is of the binary type, it is sufficient to provide two separate states, as regards modulation, and therefore two frequencies. According to this embodiment, the fluorescent tubes are supplied during the label updating periods by a first frequency to represent a logic "1" and a second frequency to represent a logic "0". As indicated above, the emitted luminous intensity decreases with frequency. The luminous intensity received by the electronic labels will therefore fluctuate at the rate of the information sent by the encoder.

According to a preferred embodiment of the invention, pulse width or phase modulation is carried out, around a time interval connected with the period of the supply signals of the fluorescent tubes. Preferably, the reference time interval is chosen equal to the half period of the mains, i.e. 10 ms. Here again, it is sufficient to provide two separate states during the updating phase, which are interpreted by the decoder as a succession of binary states.

The invention therefore relates to a message transmission system comprising a transmitter and at least one receiver, the transmitter comprising a generator of digital data representing the message, means for encoding these data in a determined serial digital code and means for modulating electromagnetic radiation in a determined way, each receiver comprising at least means which are sensitive to said modulated electromagnetic radiation and convert it into electrical signals, and decoding means for reconstructing said message from the converted signals, characterized in that the modulation means control components for illumination with visible light in such a way as to modify the intensity of the emitted light energy in two separate states during the periods in which said messages are sent, in that said means sensitive to the electromagnetic radiation detect these states so as to deliver electrical signals having two separate states.

The invention also relates to a method for employing such a system.

The invention lastly relates to the application of this system to the updating of data displayed by electronic labels arranged on display shelves for articles in a store.

The invention will be understood more clearly, and other characteristics and advantages will become apparent on reading the description which follows with reference to the appended figures, in which:

FIG. 1 schematically illustrates a system according to the invention, applied to the updating of data displayed by electronic labels arranged on shelves for displaying articles in a store;

Figure 4B:
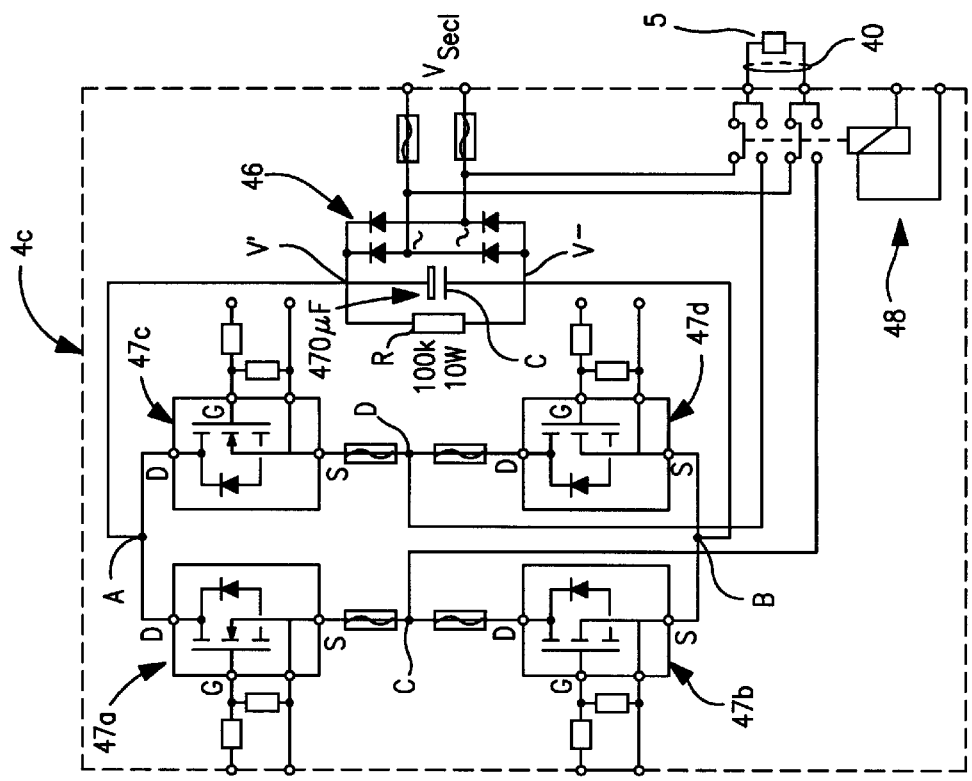
Figure 4A:
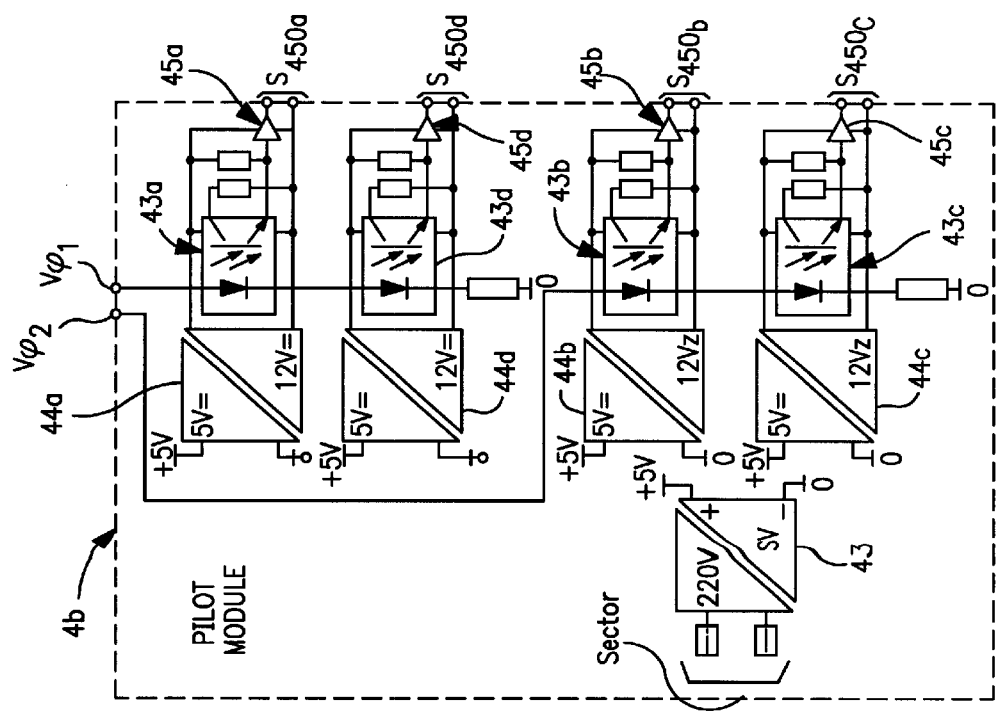
Figure 5:
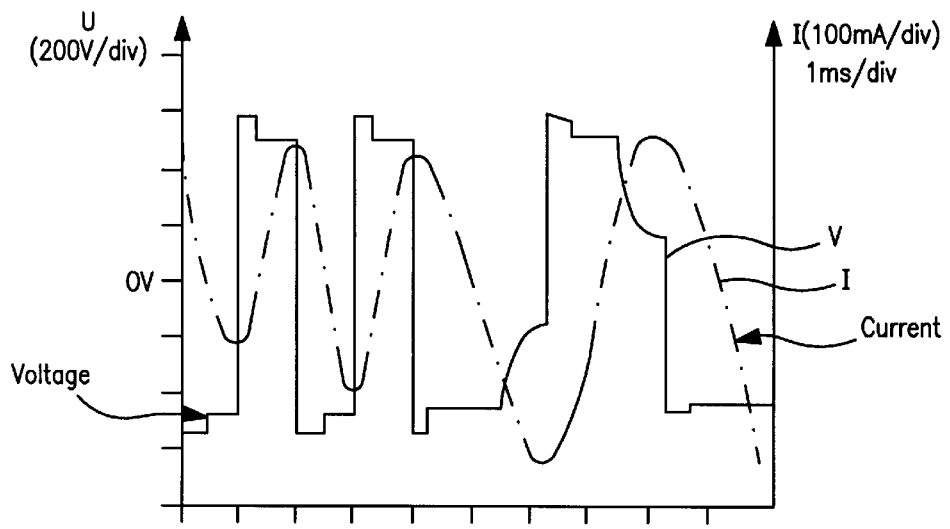
Figure 6:
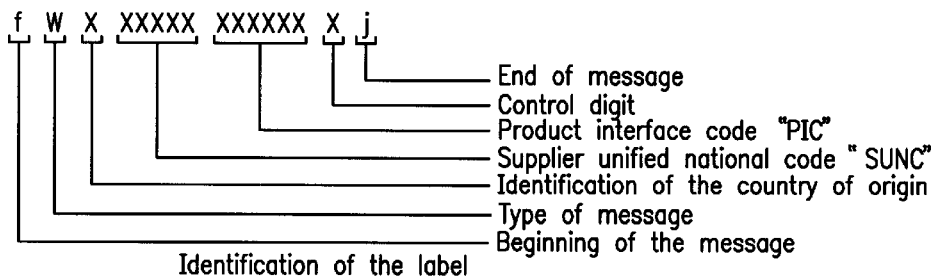
Figure 7:
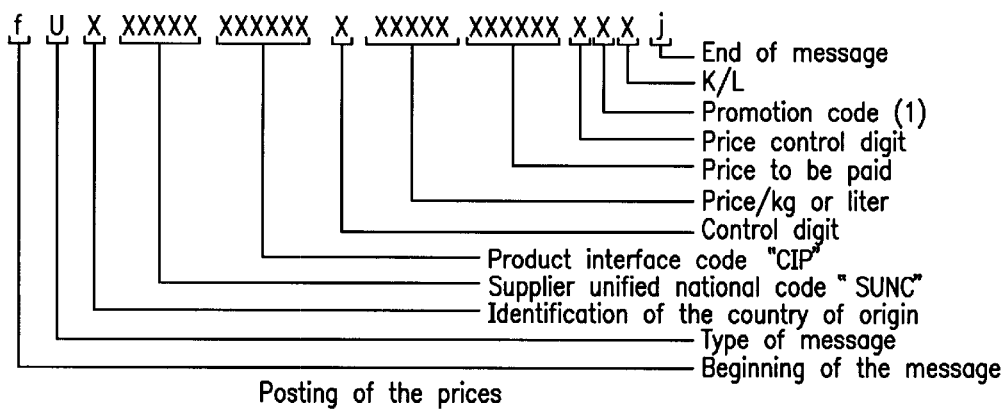
Figure 8:
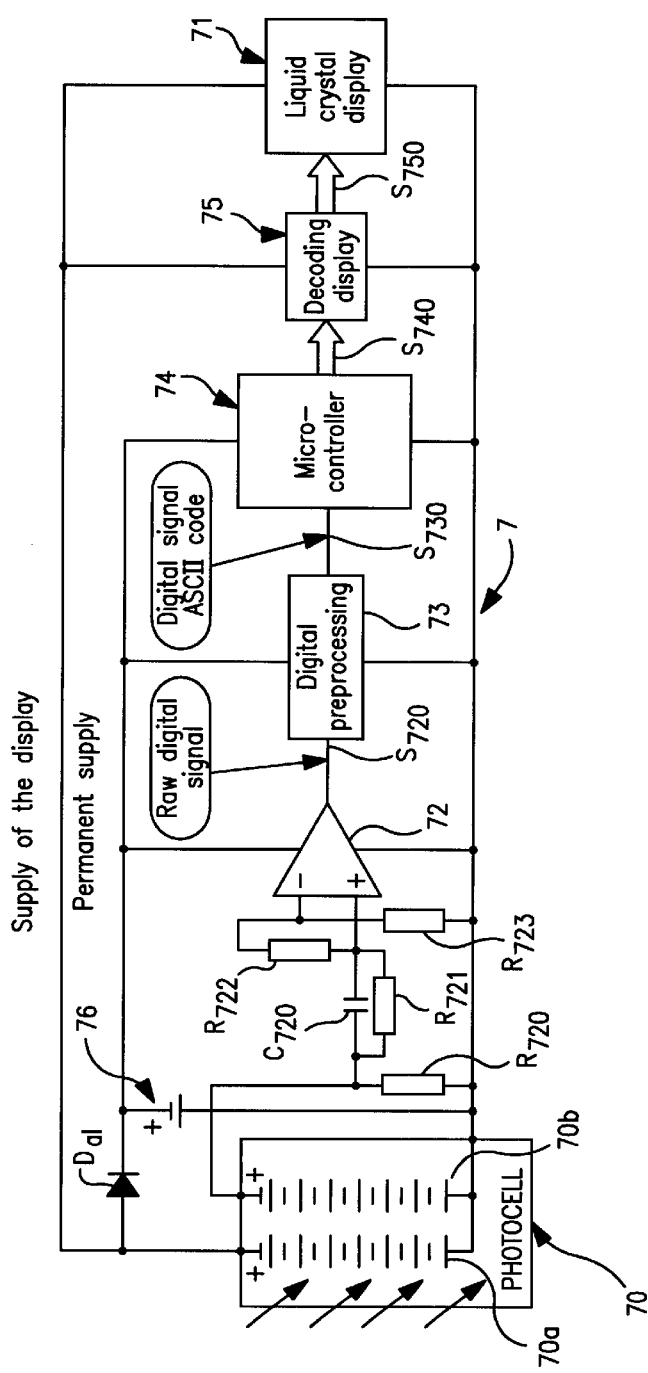
Figure 9:
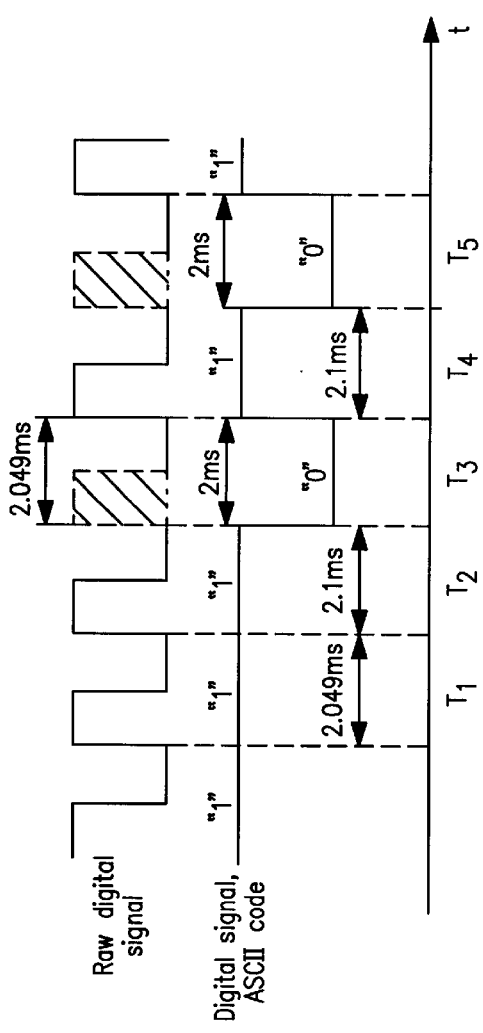
Figure 12:
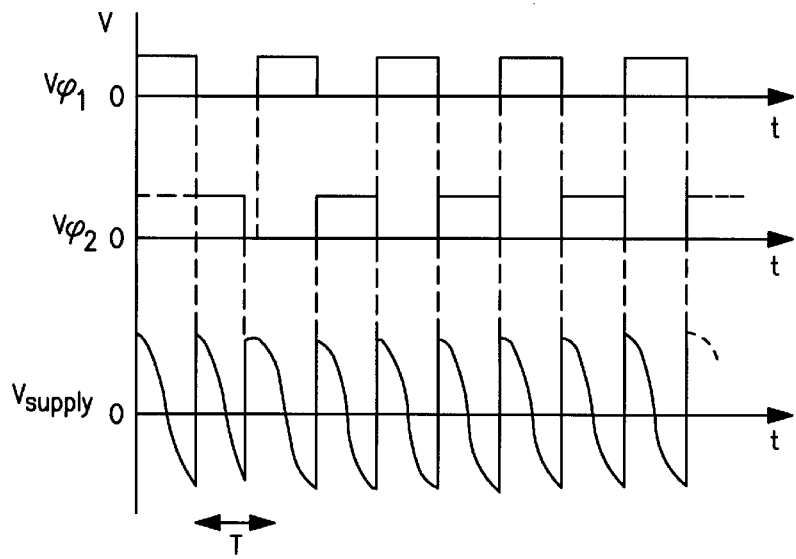
Figure 15:
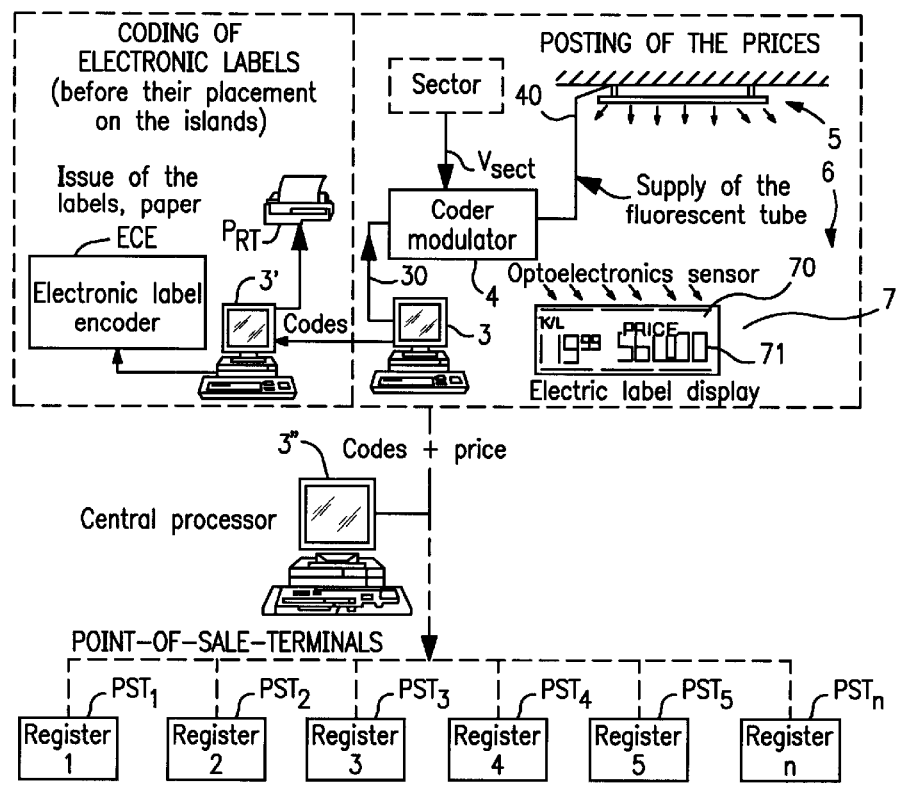

FIGS. 4a and 4b schematically illustrate a modulator drive stage and the modulator according to the first alternative embodiment;

FIG. 5 is a time diagram schematically illustrating the voltage and current supply signals of the illumination components for the first embodiment;

FIGS. 6 and 7 illustrate the structure of two types of messages to be sent;

FIG. 8 is a block diagram schematically illustrating an electronic label;

FIG. 9 is a time diagram schematically illustrating the signals decoded in the electronic label in the first embodiment;

FIG. 10 is a block diagram schematically illustrating an encoder according to a second embodiment;

FIG. 11 schematically illustrates a modulator according to the second embodiment;

FIG. 12 is a time diagram schematically illustrating the voltage supply signals of the illumination components for the second embodiment;

FIG. 13 is a time diagram schematically illustrating the signals decoded in the electronic label in the second embodiment;

FIG. 14 illustrates an embodiment detail of an electronic label according to an additional variant;

FIG. 15 illustrates a concrete example of application of the system according to the invention to the updating of electronic labels in a store.

Figure 1:
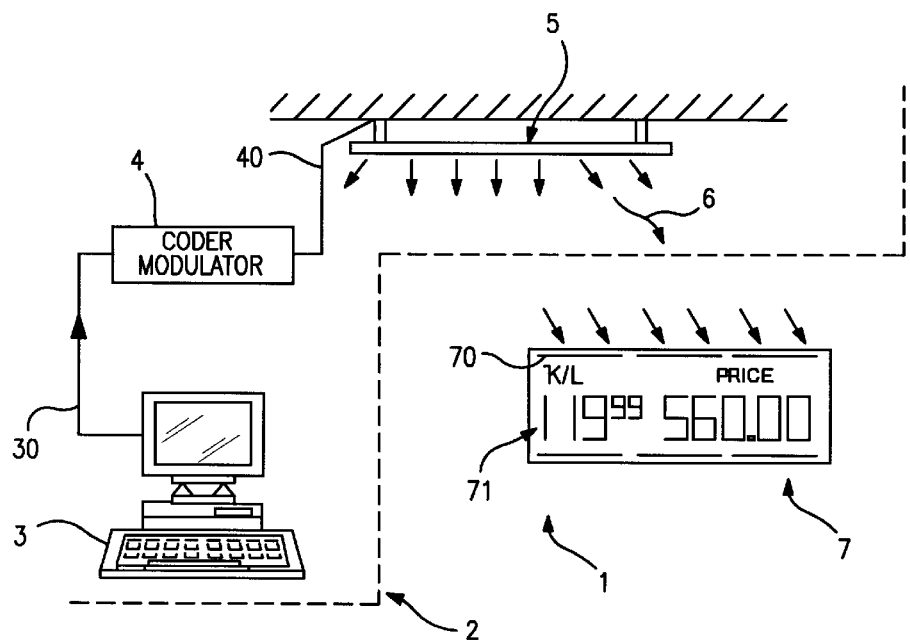

FIG. 1 schematically illustrates the general architecture of a system 1 for updating data displayed by electronic labels 7 arranged on shelves (not shown) for displaying articles in a store.

The "transmitter" part advantageously comprises a microcomputer 3, or any equivalent system for management and digital signal processing, which is connected to an encoder/modulator 4 by a suitable link, for example a serial link of the "RS232" type. Schematically, a link 40 conveying control signals compiled by the encoder/modulator 4 has been represented, these signals modulating the light emitted by one or more fluorescent tubes 5. These tubes are a priori on continuously and provide the background lighting of the sales surface in which the electronic labels 7 are found. The latter receive the emitted light and detect the modulation, that is to say the fluctuations in the background light having determined characteristics. In order to do this, these labels comprise optoelectronic cells 70, converting the light energy into electrical signals, decoder circuits and signal processing circuits which will be discussed below. Lastly, the electronic label 7 is provided with a display 71.

When it is desired to modify some or all of the displayed data, in the case of an electronic label, a binary message intended for an electronic label is sent to the encoder/decoder 4. In order to do this, the microcomputer 3 is used. The microcomputer includes, in order to do this, an interface card designed for serial data transmission and reception, for example of the aforementioned "RS232" type, with an external clock which makes it possible to synchronize the modulation. This operation may be carried out using the keyboard or by a recorded program, for example for a systematic sequential updating operation.

The data updated may be of several types, but in practice they essentially relate to eminently variable data such as price or particular information about promotional or temporary offers. The electronic label will customarily be provided with a display zone relating to the type of data which have just been mentioned.

A first embodiment of the system according to the invention will now be described in detail. According to this embodiment, the emitted light is modulated, during the periods of updating the electronic labels, by two separate frequencies: $f_1$ and $f_2$. More precisely, supply circuits particular to the invention are substituted for the main supply (which has a frequency of 50 Hz in France). These circuits generate square-wave signals under the aforementioned two frequencies $f_1$ and $f_2$, in time with the control signals received from the microcomputer 3 via the serial link 30.

To give a concrete idea, the following two frequencies were chosen: $f_1$=244 Hz and $f_2$=488 Hz, this being for technical reasons. Specifically, one of the possible circuits which can be used in the scope of the invention is a microcontroller whose internal clock runs at 8 Mhz [sic]. Dividing this frequency by an integer number N which is a power of 2, it is possible to obtain a low frequency which is a submultiple of the clock. In order to do this, a conventional divider is employed. In order to obtain the aforementioned frequency $f_1$=244 Hz, $N=2^{15}$ may be chosen, and the frequency $f_2$=488 Hz is obtained when remultiplying it by 2. The transmission rate is chosen equal to 244 bauds, which is close to the rate customarily used on a serial link of the aforementioned type, i.e. 300 bauds.

Figure 2:
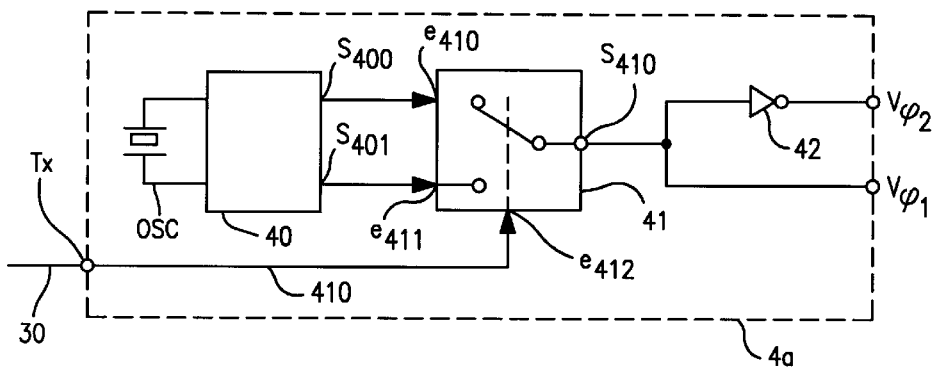
FIG. 2 is a block diagram schematically illustrating an encoder according to a first alternative embodiment of the invention.

FIG. 2 is a block diagram schematically illustrating the encoder part 4a of the encoder/decoder circuits 4 in FIG. 1.

This encoder circuit comprises a timebase 40 which is driven by a high-frequency oscillator OSC and is divided in order to obtain, at outputs $S_{400}$ and $S_{401}$, two clock signals at the aforementioned frequencies $f_1$=244 Hz and $f_2$=488 Hz. A switch 41 which delivers one or other of the above frequency signals on its output $S_{410}$ is arranged in cascade with the timebase 40. This switch 41 consists of conventional electronic circuits, for example inverting operational amplifiers with differential inputs, in "CMOS" technology. It receives the signals of frequency $f_1$ on a first input $e_{410}$, and the signals of frequency $f_2$ on a second input $e_{411}$.

The switch 41 is controlled, on a third input $e_{412}$, by the signals Tx which originate from the microcomputer 3 and are sent on the serial link 30 and the link 410 internal to the circuits 4a.

Figure 3:
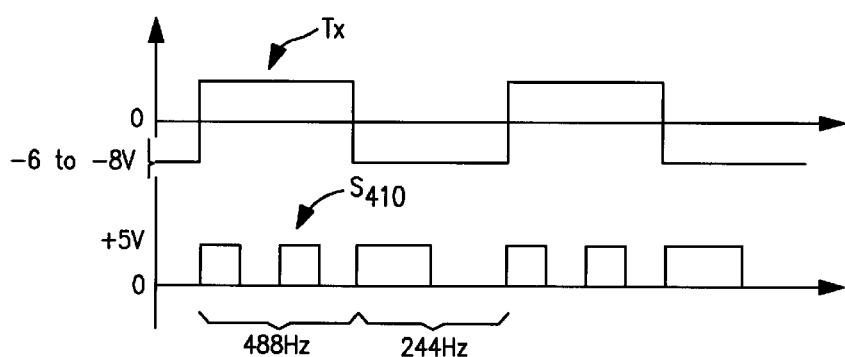
FIG. 3 is a time diagram schematically illustrating the modulation control signals as a function of the logic states of the message to be sent.

FIG. 3 is a time diagram representing an example of control signals Tx (upper part) and resultant signals on the output $S_{410}$ of the switch 41.

If an "RS232" link is used, the logic "0" is represented by a negative voltage (−6 to −8 V) and the logic "1" is represented by a positive voltage.

When Tx is in the "1" state, the frequency of the signals on the output $S_{410}$ is 488 Hz, and 244 Hz in the converse case. If the "TTL" standard is used, the signals alternate between the values 0 and +5 V. When no transmission is active, the link signal Tx is permanently at the low level (−6 to −8 V), in which case the output frequency is 244 Hz.

For practical reasons which will be explained below, it is necessary to provide normal and inverted signals (180° phase shift) at the output of the decoder 4a. In order to do this, it is sufficient to use an inverter 42 whose output $V\phi_2$ provides signals phase shifted by 180° relative to the signals $V\phi_1$, a direct replica of the signals delivered on the output $S_{410}$.

The modulator part of the encoder/decoder circuits 4 in FIG. 1 is schematically illustrated by FIGS. 4a and 4b. In the example illustrated, the modulator itself can be split into two parts: a module 4b which will be referred to as drive and the modulator 4c itself or power stage. In these figures, only the elements essential to full understanding of the invention have been explicitly referenced.

As will be shown with reference to FIG. 4c, the modulator 4c which gates the signals which are at a high voltage and under a relatively high power, must be DC isolated from the logic circuits of the decoder. The latter circuits should also be protected from electromagnetic interference (very noisy power circuits).

Thus, in a preferred variant of the invention, optoelectronic couplers are employed which has [sic] the feature of providing good DC isolation between the input and the output. In order to do this, components of the CNW 139 type may be used.

In practical terms, two pairs of couplers $43_a$–$43_d$ and $43_b$–$43_c$, respectively, are provided. The couplers in each pair are arranged in series and have one of the control signals, $V\phi_1$ or $V\phi_2$, in phase or in phase opposition, respectively, applied to them. Each coupler $43_a$ to $43_d$ comprises a light-emitting diode $D_a$ to $D_d$ and a phototransistor $T_a$ to $T_d$ which receives the flux emitted by the diode associated with it. The output signals of the optoelectronic couplers $43_a$ to $43_d$ are sent to the outputs $S_{450a}$ to $S_{450d}$ of the drive module 4b, via amplifiers $45_a$ to $45_d$. "CMOS" technology operational amplifiers may be chosen.

In order to obtain full DC decoupling, it is necessary to supply the optoelectronic couplers $43_a$ to $43_b$ [sic] and the amplifiers 45a to 45d with separate supply sources $44_a$ to $44_d$. In the example described, DC-DC supplies have been provided, for example supplied with +5 V as input by a general supply 43 and delivering a voltage of +12 V as output. The general supply receives the mains voltage as input and converts it into a +5 V DC voltage. All these supplies 43 and $43_a$ to $43_d$ advantageously consist of electrical inverters or similar devices comprising an input/output isolation transformer. Commercially available modules may be employed, for example of the "2CHR0512s" type, providing a +5 V DC voltage from a +12 V DC voltage.

FIG. 4c represents an illustrative embodiment of the modulator part 4c proper, or power output stage.

In the example described, gating of a DC voltage is employed, in time either with the frequency $f_1$=244 Hz or the frequency $f_2$=488 Hz, according to an important characteristic of the invention. During the updating periods (sending the information), the voltage thus gated is substituted for the normal supply voltage, that is to say the 50 Hz (in the case of France) mains voltage.

In order to do this, the output stage 4c comprises a diode bridge 46 rectifying the mains $V_{main}$ and filtering of the "RC" type in cascade. This simple filtering is sufficient in the scope of the invention. It is not necessary to regulate the voltage thus obtained between the terminals $V_+$–$V_-$ of the resistor $R_1$/capacitor $C_1$ parallel network. By way of example, a 100 kΩ/10 W resistor $R_1$ and a 470 μF electrolytic capacitor $C_1$ are chosen. The DC voltage obtained is about 400 V. This voltage present between the terminals $V_+$–$V_-$ supplies a bridge of four electronic switches which consist of power field-effect transistors, or FETs, in "CMOS" technology. To give a concrete idea, transistors of the STE50N40 type commercially sold under the THOMSON brand may be used.

A modulator, with the semi-conductor elements which are employed, can supply several tens of conventional fluorescent tubes. A hundred tubes typically consume 30 A rms. At saturation, the internal impedance of the transistors is very low, of the order of 70 mW [sic], which leads to very low losses.

More precisely, the filtered voltage supplies two end points, A and B, of the bridge. The sources S of the lower (in the figure) transistors 47b and 47d are connected to the point B (lower point), and the drains of the upper (in the figure) transistors $47_a$ and $47_c$ are connected to the point A (upper point). Similarly, the sources S of the transistors 47a and 47c are connected to the points C and D (left-hand and right-hand points in the figure), respectively, and the drains of the transistors $47_b$ and $47_d$ are connected to the point [sic] C and D, respectively.

Each transistor $47_a$ and $47_d$ is controlled by one of the signals generated by the drive module 4b, that is to say one of the signals present on the outputs $S_{450a}$ to $S_{450d}$ of the amplifiers $45_a$ to $45_d$. At any time, depending on the polarity of the control voltages $Vj_1$ or $Vj_2$, that is to say depending on a logic "0" or "1" is sent to the encoder 4a via the link 30 (FIG. 1), two FET transistors of one of the diagonals of the bridge are turned on. This is because the signals present on the outputs $S_{450a}$ and $S_{450d}$ although DC decoupled, are in-phase signals. The same is true as regards the signals present on the outputs $S_{450b}$ and $S_{450c}$. The bridge of transistors $47_a$ and $47_d$ acts in a similar way to a "flip-flop" in time with the control signals. These have two characteristic frequencies $f_1$ and $f_2$, as indicated. The filtered voltage is thus also gated at two separate frequencies.

The fluorescent tubes 5 are connected between the points C and D during the data transmission periods. The frequency of the supply voltage is thus either 244 Hz (logic "0") or 488 Hz (logic "1").

In normal periods, the fluorescent tubes 5 are supplied by the mains directly, i.e. by a sine-wave voltage at 50 Hz. In order for this to be done, a two-way relay 48 may be used. Also, in normal periods, the relay is inactive (first state) and the fluorescent tubes are supplied by the mains. During data transmissions, the relay receives a suitable control signal, which may be generated by the encoder, and changes to the activated state (second state). The fluorescent tubes are then supplied by the gated voltage.

The background luminosity of a room illuminated by fluorescent tubes is typically of the order of 700 Lux if they are supplied with a voltage at 50 Hz. If the frequency changes to 244 Hz, the luminosity decreases to about 350 Lux, and to about 175 Lux for a frequency of 488 Hz.

It will be readily understood that, if a component sensitive to the luminous intensity is provided, it is possible to discriminate between these three states, the last two being present only in the active data transmission phases and representing logic "0"s or "1"s.

FIG. 5 is a time diagram schematically illustrating typical variation curves of the current I and the voltage U as a function of the gating frequency. The first two voltage pulses represented have a frequency of 488 Hz, and the third 244 Hz. It can be seen that the peak to peak amplitude of the current I flowing through the fluorescent tubes varies with the frequency. Since the luminous intensity emitted by a fluorescent tube is conditioned by the amplitude of the current, it can be seen that this intensity follows a similar law.

Before describing the component sensitive to the variations in luminous intensity, in particular an electronic label, it first seems appropriate to outline a communication protocol which can be used in the scope of the invention.

As indicated, serial transmission of the following type may be employed for the serial link: asynchronous "RS232", 8 bits with 1 STOP bit, no parity. The transmission rate is chosen equal to 244 bauds.

For the preferred application of the invention, the display requirement is typically limited to 10 digits from 0 to 9. This characteristic is exploited by transcoding these digits so as to limit the light fluctuation phenomena (pulsation). By way of explanation, the modulation leads to large variations in the luminous intensity emitted by the fluorescent tubes, and these fluctuations can be perceived by the human eye and are uncomfortable. In order to limit this discomfort, particular codes may be employed, with which a given message sent gives rise to alternations of "0" and "1" which minimize the undesirable pulsating effects. By way of example, an alternation of "0" and "1" does not cause the same sensations as two "0"s and two "1"s in succession. The Applicant Company has carried out research allowing the best possible code combinations to be chosen experimentally. The following table gives an example of such decimal/hexadecimal transcoding:

| Digits | 0 | 1 | 2 | 3 | 4 | 5 | 6 | 7 | 8 | 9 |
|---|---|---|---|---|---|---|---|---|---|---|
| Hexa encoded characters | $DF | $77 | $5F | $EF | $B5 | $BB | $6F | $75 | $B7 | $BF |

If there is more than one electronic label, which is the case in general, the operation of updating the data displayed by an electronic label to be updated includes two phase [sic].

The first phase relates to its identification or its addressing. This is needed because only this particular electronic label must react to the message sent. It must "recognize" this [sic]. A first message thus relates to identification. FIG. 6 illustrates an example of an identification message comprising 16 characters. This message starts with a particular character, for example the character "{", and ends with another particular character, for example the character "}". The second character indicates the type of message, for example "W" for an identification message. The third character indicates the country of origin code, the following five characters indicate the "Supplier Unified National Code" or "SUNC", the following six characters indicate the "Product Interface Code" or "PIC" and the following character is a check character. A label dedicated to a particular product will be able to identify itself by decoding a message intended for it and position itself in a standby state for receiving an update message.

The second phase relates to the actual updating. The label in the standby state waits for an update message. FIG. 7 illustrates an example of such a message which comprises 30 characters. As before, the message comprises characters d [sic] start and end, "{" and "}", respectively. The second character transmitted represents the type of message, for example "U" for update. The third character again represents the country of origin code, the following five characters indicate the "Supplier Unified National Code" or "SUNC", the following six characters indicate the "Product Interface Code" or "PIC" and the following character is a check character. The following five characters represent the new price per kilogram or per liter, the following six characters represent the new price, the following character represents a price check character, the following character represents a promotion code, and the penultimate character represents the "kilogram" or "liter" designation.

In the messages represented in FIGS. 6 and 7, the character "X" symbolizes the code of an arbitrary number ranging from 0 to 9. The check characters are generated by calculation, for example by employing the "EAN13" encoding standard and sent as a digit ranging from 0 to 9. The thirteen "useful" characters: price per kg or liter, price, promotion code and "kilogram" or "liter" designation are stored in the electronic label until the next update and are displayed by the visualization component 71.

The receiver part of the system will now be described, that is to say the electronic label in the preferred application of the invention.

FIG. 8 is a block diagram schematically illustrating the main components of the electronic label 7.

It firstly comprises a photoelectric element 70. In reality, this element comprises a first photoelectric cell $70_a$ intended to supply electrical energy, and a second electrical cell $70_b$ intended to pick up the encoded signals transmitted by the light energy. It is further necessary to keep most of the circuits continuously supplied, even if the electronic label is not being illuminated, with the exception of the display circuits. In order for this to be done, the first photoelectric cell charges an accumulator 76 via a one-way diode $D_{a1}$. This arrangement makes it possible to avoid having to resort to batteries, which are relatively expensive in large numbers and which have to be changed when they have run down.

The photoelectric cell $70_a$ is loaded by a resistor $R_{720}$ in parallel with an "RC" type network which comprises a resistor $R_{721}$ in parallel with a capacitor $C_{720}$ and is in series with a voltage divider comprising two series resistors $R_{722}$ and $R_{723}$. The mid point of the voltage divider is connected to the "−" terminal of an operational amplifier 72, and the output of the "RC" network is connected to the "+" input of this operational amplifier 72. These circuits form a stage for converting and shaping the light signals at the output of the photoelectric cell $70_b$ into binary signals.

To give a concrete idea, the resistors and the capacitor have the following numerical values: $R_{720}$=1 MW, $R_{721}$=40 MW, $R_{722}$ =$R_{723}$=100 KW [sic] and $C_{720}$=33nF. The operational amplifier may be of the "LMC6041" type.

The time constant due to the "RC" circuit makes it possible to obtain the aforementioned functions, and the presence of the capacitor C720 (in parallel with a very high resistance) makes it possible to block the DC component of the signals, which component is due to the background light. The device is therefore sensitive only to the useful signals.

At the output $S_{720}$ of the amplifier 72, signals in two states are obtained which will be referred to as "raw"signals. They are in fact square-wave signals whose frequency, 244 or 488 Hz, is determined by the frequency of the fluctuations of the light, during the data transmission periods. It remains to reconstruct the original message, that is to say an ASCII code for example, from these square-wave signals.

In order for this to be done, a digital preprocessing circuit 74 is arranged in cascade. This circuit may be formed, for example, using a monostable whose timebase is 2.1 ms and which can be retriggered by the input signals on input on [sic] leading edge. By way of example, a double monostable of the "74HC123" type may be used.

FIG. 9 is a time diagram representing examples of input signals of the monostable 73 and of its output. Five arbitrary time intervals, designated $T_1$ to $T_5$, corresponding to five successive periods of the output signals of the monostable 73, have been represented on the time axis t. In the example which is represented, during the time interval $T_1$, the input signals of the monostable 73 have a frequency of 488 Hz, i.e. a period of 2.049 ms and the output of the monostable 73 is at logic "1". Since the natural period of the monostable is 2.1 ms, it will be retriggered on the leading edge of the input signal at 2.049 ms. Conversely, during the time interval $T_2$, the input signal has a frequency of 244 Hz and a half period equal to 2.049 ms. One pulse is therefore missing (hatched zone). The output of the monostable 73 will return to zero at the end of the interval $T_2$, because it is not retriggered. The time interval $T_3$ has a duration of about 2 ms, because the monostable 73 will be retriggered on the leading edge of the input signals (end of the half period) of the signals at 244 Hz. Similarly, at the end of the time interval $T_4$, the monostable 73 is not retriggered, and the output signal returns to logic "0". $T_4$ lasts 2.1 ms (timebase of the monostable). At the end of the time interval $T_5$, the monostable is again triggered by the leading edge of the input signal (end of the half period at 244 Hz). The output signal is then at logic "1". The initial encoding signal is thus recovered at the output in "ASCII" code. The partial binary sequence, in the example chosen, is therefore "11011".

The encoded message thus reconstructed is then sent to circuits 74 for processing the information, which for example consist of a microcontroller of the "MC68HC811E2FN" type, comprising internal storage means. As indicated, there are two successive messages during an update. A first message identifies the label (addressing). The circuits 74 recognize an identification message in the conventional way. This recognition allows them to be put in a state of waiting for the update message proper. The data corresponding to this update "refresh" or erase those previously recorded. These new data are stored until a new update is carried out.

In order for this to be done, as indicated, all the circuits apart from the display circuits (see below) are continuously supplied by the accumulator 76.

The circuits 74 control the display components 76, for example liquid-crystal display components, via conventional decoder circuits 75. By means of this, the display is also updated and corresponds to the new data which are sent.

In a second embodiment of the invention, the coding is carried out not by frequency modulation but by pulse width modulation, which entails a phase shift relative to a reference period, advantageously the half period of the mains, i.e. 10 ms (in France).

FIG. 10 illustrates an encoder 8 according to this embodiment. It comprises a timebase 80 synchronized by clock signals $H_{50}$ at 50 Hz which are derived from the mains. This timebase provides square-wave signals with a period of 10 ms. These signals are used as a synchronization clock for two monostables 81 and 82 having two individual time constants $\tau_1$ and $\tau_2$, respectively. The time constant $\tau_1$ can be adjusted so that the signals generated at the output $S_{810}$ of the monostable 81 have a period slightly longer than that of the signals at the output $S_{811}$ of the monostable 82.

In this embodiment, the signals on the output $S_{811}$ are resent to the microcontroller 3, more precisely to its serial interface card, via a link $H_{ext}$, as an external clock, and are used as 100 Hz synchronization signals for the transmission of the control signals.

The signals on the outputs $S_{810}$ and $S_{811}$ are sent to two inputs of a multiplexer circuit 83. The latter is controlled by the encoded signals sent by the link 30 (FIG. 1), that is to say the signals Tx. These signals are sent to the control input $e_{830}$ of the multiplexer 83. Depending on the logic state of these signals, the signals present on one or other of the outputs, $S_{810}$ or $S_{811}$ are sent to the output $S_{830}$ of the multiplexer 83. The output pulses $S_{830}$ therefore have periods of variable length, depending on the binary signals Tx at the input of the encoder 8. More precisely, the duration is 10 ms and 10 ms+$\Delta$t.

To give a concrete idea, the following integrated circuit may be used for the monostables: "74HC123", the following integrated circuit as multiplexer: "74HC153" and the following integrated circuit as "JK" flip-flop: "MC14027". The time constants are determined by "RC" type circuits. By way of example, a 0.1 $\mu$F capacitor and a fixed 82 k$\Omega$ resistor may be used. For the time constant $\tau_1$, a 10 k$\Omega$ variable resistor is added in series, which makes it possible to set the total resistance to 91.2 k$\Omega$.

The signals present on the output $S_{830}$ are sent to a clock input CLK of an output flip-flop 84, for example of the "JK" type.

According to another particular feature, the leading edge of an "RST"signal is used to initialize this flip-flop during the periods in which the updating messages are sent. This signal also originates from the microcomputer 3 and is sent on a particular link.

The signal at the output $S_{840}$ of the flip-flop 84 is used as an output signal of the encoder. This signal is intended to be sent to the drive module. The same module (FIG. 4a: 4b) may be used as in the case of the first alternative embodiment. It is necessary to provide signals in phase opposition (180°+$\Delta\phi$), and the signals present on the output $S_{840}$ are sent to the drive module 4b directly: output $V_{100\ 1}$, and via an inverter: output $V_{\phi 2}$. These two signals are used as input signals for the couplers $43_a$ to $43_d$. In the case of this second embodiment, their periods are substantially equal. More precisely, the output signals $S_{840}$, are split into a pulse in the "1" state for about 6 ms and in the "0" state for about 4 ms.

An example of a modulator according to the second variant is represented in FIG. 11. It comprises four identical diode rectifier bridges $90_a$ to $90_d$, themselves connected as a bridge, between four points A' to D'. The mains voltage $V_{main}$ is directly applied between the points A' and B'. The fluorescent tubes 5 are supplied between the points C' and D'. The points A' to D' are each connected to an AC voltage input of the four bridges $90_a$ to $90_d$. A power field-effect transistor, or FET, in "CMOS" technology $91a$ to $91_d$, respectively, is connected in parallel with each diode rectifier bridge $90_a$ to $90_d$, between its "+" and "−" terminals. These transistors may be of the same type as those used in the first alternative embodiment (FIG. 4b), i.e. of the "STE 50N40" type. The rectifier bridges may be of the "GBPC 3506" type from "GENERAL INSTRUMENT".

As before, the transistors $91_a$ to $91_d$ are controlled by the output signals $450_a$ to $450_d$ originating from the drive stage $4a$. At any time, two out of four transistors are activated, in the diagonal branches. The same is true as regards the bridges which are associated with them.

FIG. 12 is a time diagram illustrating the signals $V_{\phi 1}$, and $V_{\phi 2}$, on the one hand, and the supply signals $V_{supp}$ of the fluorescent tubes 5 resulting therefrom, on the other hand.

Outside the periods in which the encoded signals are sent, the pulses forming the signals $V_{\phi 1}$ and $V_{\phi 2}$ are in phase with the half periods of the mains ($V_{main}$). The consequence of this is that the supply signals of the fluorescent tubes 5, as shown by FIG. 12, are formed by sine-wave quarter cycles, lasting 10 ms, starting from a positive maximum, passing through zero and decreasing to a negative maximum. The cycle is then repeated identically.

However, if one of the edges of the control pulses is phase shifted relative to the half period of the mains, the flip between rectifier bridge diagonals will be brought forward. The consequence of this is that one of the half periods of the supply voltage $V_{supp}$ is shorter than the next. This case is represented in FIG. 12, during the time interval T. As before, this variation in the supply conditions will lead to a fluctuation in the light emitted by the fluorescent tubes 5, which fluctuation can be detected by the electronic labels 7.

As regards the latter, the same circuits may be used as for the first embodiment. The photoelectric cell $70_b$ detects the fluctuations in pulse width and converts them into electrical signals sent to the amplifier 73. However, in this case, the "raw" digital signals at the output $S_{720}$ of the amplifier 72 have a different configuration from those of the first variant. FIG. 13 is a time diagram illustrating the profile of these signals. Outside the periods in which the update data are sent, they are rectangular signals in the "1"state for 6 ms and in the "0"state for 4 ms. However, during the data transmission periods, the encoding has the effect that the supply signals of the fluorescent tubes 5 are no longer symmetrical. The preprocessing circuits 73 distinguish the pulses of duration typically greater than 6.2 ms from those of duration less than 6 ms, which makes it possible to recreate the initial "ASCII" code at the output $S_{730}$. This code, conveyed by the "RS232" link (FIG. 1: 30) is represented in the lower part of FIG. 13.

The subsequent processing of the reconstructed "ASCII" signals is strictly identical to that of the signals reconstructed by the circuits according to the first alternative embodiment. It is therefore superfluous to describe it again.

In an additional variant, illustrated by FIG. 14, common to the two embodiments, the signals at the output $S_{730}$, that is to say the reconstructed "ASCII" code, may be resent for verification, using a radio transmitter 77 provided with an antenna 78, for example on an FM band. This code then modulates a carrier frequency. The transmission is picked up by a central installation and the code reconstructed by the label is compared with the code sent by the microcomputer 3 on the serial link 30. There is naturally a time lag since, for example, a "1" is generated after checking that a signal lasting longer than 6.2 ms has been received by the label 7.

A radio transmission module supplied by "RADIOMETRIX LTD", of the TXM-418-A type may be used. The range is about 30 m and the carrier frequency 433.92 Mhz [sic]. The pass band is 10 Kbits/s, which is broadly dimensioned for the opalization envisaged.

To give a concrete idea, it takes about 2 seconds to update a label. It is therefore possible to update 30 labels per minute, i.e. 300 labels in 10 min.

A preferred application example of the system according to the invention, that is to say its application to retailing, will now be described in more detail with reference to FIG. 15.

The phase of updating prices on electronic labels and "volatile" information was essentially described above. There is, however, a preliminary phase before the electronic labels are put on the shelves. Specifically, each electronic label has to undergo encoding with the printing of a paper label for the article code and its reference. These data are recorded in the information processing circuits 74, either in a volatile memory, or preferably in a reprogrammable memory, for example of the "EEPROM" type or the like.

In the course of its life, an electronic label may be assigned to different articles. Although it is theoretically envisageable to update the electronic labels for all kinds of data, the method according to the invention will in practice be used only for updating so-called "volatile" data (price, etc.). The other data are recorded in the electronic label by initial encoding.

In order for this to be done in a real organization, corresponding to a store, the microcomputer 3 is connected to the central computer 3" of this store, which communicates to it composite data of the "article codes+price" type, which are recorded in the memory of the microcomputer 3. In the example illustrated, the "article codes" part is sent to a microcomputer 3' dedicated to this task which controls an electronic label encoder device ECE. This is a well-known device for encoding by electrical or optical means. It will subsequently be possible for a particular electronic label to be identified by these recorded data. The printer PRT prints the recorded data, in particular to check allocations.

At this stage, the encoding may be supplemented by a test sequence. In order to do this, use may be made of a fluorescent tube controlled by the microcomputer 3' or by the encoder device, in a similar way to the general method.

Lastly, the point of sales terminals $TPV_1$ to $TPV_n$ present in the store advantageously receive, in real time, the same information as the microcomputer 3. Since this type of terminal is customarily provided with an optical bar code reader, the prices are updated simultaneously.

From reading the above description, it is easy to see that the invention does indeed achieve its objects.

The scope of the invention is not, however, limited to the specific embodiments which have been described, in particular with reference to FIGS. 1 to 15. In particular, the numerical examples were given only to explain the invention more clearly. These data depend essentially on the specific application, and, like the constituents which are used, form no more than a technical choice within the scope of the person skilled in the art.

It should also be clear that, although particularly suitable for retailing applications, for updating data displayed on an electronic label, the invention is not confined to this type of application alone. It applies equally well to various types of transmission which use, whenever it can be used, background artificial lighting as a modulation vector.

In this regard, although tubes of the fluorescent type are particularly suitable in the context of the invention, tubes of the halogen type also permit operation under very good conditions, because the ionization is also immediate. Although the efficiency of incandescent bulbs is lower, because of the remanence due to their resistivity, they are nevertheless still usable in the context of the invention.

What is claimed is:

1. A message transmission system comprising a transmitter and at least one receiver, the transmitter comprising:

a generator for generating a digital data signal representing a message, the digital data signal having a first and a second logic state, encoding means for encoding the digital data signal into a serial code having first and second frequencies representing respectively the first and second logic states of the digital data signal, modulation means connected to at least one light source of visible light for modulating an intensity of light emitted by the light source with the serial code, the visible light emitted by the source having first and second distinct intensities when the light intensity is modulated with the first and second frequencies respectively, the at least one receiver comprising:
- at least one detection means sensitive to the visible light emitted by the light source for converting visible light emitted by the light source into an electrical signal having first and second states depending on the intensity of the visible light, and
- decoding means for reconstructing the message from the electrical signal.

2. The system according to claim 1, wherein said encoding means further comprise means for generating as an output a first and a second series of digital control signals which are copies of the encoded digital data signal, said first series of the digital control signals being in phase with the digital data signal, the second series of the digital control signals being in phase opposition with said digital data signal, said modulation means comprising at least one four-branch bridge, including one electronic switch arranged on each branch, each switch of two branches which lie opposite on a first diagonal of the at least one four-branch bridge receiving the digital control signals of the first series, and each switch of two branches lying opposite on a second diagonal of the at least one four-branch bridge receiving the digital control signals of the second series, the at least one four-branch bridge having a first and second pairs of junction points, said first pair of junction points being connected to a determined supply voltage and said at least one light source being connected to said second pair of junction points of the at least one four-branch bridge so that, at any time, only one diagonal of the at least one four-branch bridge is activated, and transmitting supply energy to said at least one source of visible light, at a rate with which said first and said second series of the digital control signals vary.

3. The system according to claim 1, wherein said at least one visible light source is a fluorescent tube controlled by said modulation means.

4. The system according to claim 1, wherein said at least one receiver is an electronic label comprising at least one photoelectric cell which picks up and converts said light intensity into electrical signals, means for converting the electrical signals into digital signals having two separate states depending on the intensity of said light intensity picked up and converted by said photoelectric cell, means for decoding said digital signals, so as to reconstruct the message transmitted by said transmitter, means for processing and storing data contained in the reconstructed message, and means for displaying the stored data.

5. A method for transmitting a message between a transmitter and at least one receiver, comprising a transmission phase and a reception phase,
said transmission phase comprising the steps of:
- generating a digital data signal representing a message to be transmitted, said digital data signal having first and second logic states,
- encoding said digital data signal in a determined serial digital code having first and second frequencies corresponding respectively to said first and second logic states, and
- modulating intensity of a visible light emitted by at least one light source in two separate states with said serial digital code, said light emitted by said light source having first and second distinct intensities when said light intensity is modulated with respectively said first and second frequencies, said reception phase comprising the steps of:
- detecting and converting the modulated light emitted by said at least one light source into electrical signals having first and second states depending on the intensity of said light, and
- decoding said electrical signals for reconstructing said message.

6. The method according to claim 5, wherein said reconstructed message is retransmitted to said transmitter by radio waves in order to check correct reception.

7. The method according to claim 5, wherein said message is transmitted in first and second sequences staggered in time, said first sequence conveying identification digital data and said second sequence conveying updating data, said method further comprising a first step of selecting at least one receiver using said first sequence and a second step of unstoring, in each receiver selected during said first step, data conveyed by said second sequence.

8. The method according to claim 5, wherein said generated digital data signal representing the message are encoded in a serial digital code of an "ASCII" type, said method further comprising a step of transcoding to a hexadecimal code, minimizing the effects visible to the human eye of the light-intensity variations due to said modulation.

9. The method according to claim 5, wherein said modulation includes generating a supply voltage to said light source, said supply voltage having said first or said second frequencies determined on the basis of said first and second logic states of said digital data signal representing the message, so as to vary the emitted visible light intensity between two determined states.

* * * * *